United States Patent [19]

Hayes, Jr.

[11] Patent Number: 5,726,636
[45] Date of Patent: Mar. 10, 1998

[54] EMERGENCY TELEPHONE WITH AUTOMATIC LOW-BATTERY SIGNALING

[75] Inventor: John Joseph Hayes, Jr., Wake Forest, N.C.

[73] Assignee: Ericsson Inc., Research Triangle Park, N.C.

[21] Appl. No.: 759,647

[22] Filed: Dec. 5, 1996

[51] Int. Cl.$^6$ .................................. G08B 91/00
[52] U.S. Cl. ................. 340/636; 340/539; 455/425; 455/572; 455/127; 379/40; 379/41
[58] Field of Search ................. 340/636, 539; 379/40, 41; 455/343, 89, 226.1, 67.1, 67.7, 422, 423, 425, 572, 573, 550, 563, 564, 575, 127; 331/111

[56] References Cited

U.S. PATENT DOCUMENTS

| | | | |
|---|---|---|---|
| 4,788,711 | 11/1988 | Nasco, Jr. ................. | 379/59 |
| 5,016,269 | 5/1991 | Rogers ................. | 379/59 |
| 5,179,724 | 1/1993 | Lindoff ................. | 455/76 |
| 5,377,256 | 12/1994 | Franklin et al. ................. | 379/59 |
| 5,392,462 | 2/1995 | Komaki ................. | 455/89 |
| 5,423,078 | 6/1995 | Epperson et al. ................. | 455/89 |
| 5,469,494 | 11/1995 | Perez et al. ................. | 375/27 |
| 5,491,837 | 2/1996 | Haartsen ................. | 455/62 |
| 5,497,507 | 3/1996 | Komaki ................. | 455/89 |
| 5,600,282 | 2/1997 | Austin et al. ................. | 331/111 |

*Primary Examiner*—Thomas Mullen
*Assistant Examiner*—Julie B. Lieu
*Attorney, Agent, or Firm*—Nixon & Vanderhye P.C.

[57] ABSTRACT

An emergency cellular telephone includes a low power timer which receives power directly from the battery and runs continuously. The timer periodically initiates battery tests and, if appropriate, low battery warnings, while the telephone is in an OFF state. The timer "wakes up" (powers-up) the telephone at a predetermined interval (for example, once per day or once per week). After each timer-controlled "wake-up", the processor performs a test to estimate remaining battery capacity (by measuring battery voltage with a load on the battery or other conventional battery charge monitoring techniques). If the remaining battery capacity is adequate, the telephone processor turns off and the timer is re-started. If the remaining battery capacity is low, a warning is issued. The low battery warning may use conventional methods, such as an aural or visual warning from the phone. Additionally, the warning may consist of an automatic wireless telephone call to a predetermined number which is loaded into the telephone by the user or carrier via the keypad and/or a system connector. The number called can be the user's land line number, another cellular number or a carrier number. The warning sent via the phone call can consist of audible tones, combination of tones, voice synthesized message or data.

13 Claims, 3 Drawing Sheets

EMERGENCY TELEPHONE WITH AUTOMATIC LOW-BATTERY SIGNALING

BACKGROUND OF THE INVENTION

1. Field of the Invention

The current invention relates generally to wireless telecommunications instruments and, in particular, to battery monitoring systems for wireless portable telephones.

2. Description of the Related Art

Portable cellular telephones provide radio-telephone communications with traditional (wired) telephones and other cellular phones. These hand-held cellular telephones are powered by small, rechargeable batteries that normally provide a limited number of hours of active calling time. Once the batteries are discharged, they must be recharged or replaced before the telephone can be used to make more telephone calls. While some types of cellular telephones are powered by larger batteries, e.g., automobile batteries, or are plugged in directly to an electric wall socket, the present invention relates to cellular telephones powered by batteries small enough to provide portable operation. Indeed, the invention relates to an apparatus and technique for periodically monitoring the amount of charge remaining in the battery and issuing low-battery warnings, if appropriate, during that time the user has placed the phone in an "off" state.

Cellular telephones are conventionally used as portable telephones that are turned on by the user when the user desires to place or receive a telephone call. Furthermore, the telephone may switch to a low power waiting state when standing-by to receive a telephone communication as is described in U.S. Pat. No. 5,179,724 entitled "Conserving Power in Hand-Held Mobile Telephones During A Receiving Mode of Operation." However, when the user is not placing a telephone call and is not expecting to receive a call, the cellular telephone is normally turned off to conserve the stored charge in the battery. By turning off the cellular telephone, all power-consuming components of the telephone are shut-down. This minimizes the electrical current drawn from the battery and thereby extends the time period on which a cellular telephone can operate on a single battery charge. Accordingly, many existing cellular telephones perform no functions when turned off.

Cellular telephones, when they are in a power-on state, notify their users when remaining battery charge is low. The user is alerted to a low-charge battery condition just prior to that time when the cellular telephone stops operating. Moreover, most current cellular telephones have a low-charge alarm implemented as an audible "beep" or as a message on a display on the telephone, that alerts the user that the battery needs to be recharged. To determine that the battery is low and to issue the alarm, certain cellular telephones include electronic circuitry to monitor the charge state of the battery and issue the alarm if the charge of the battery falls below a certain level. The cellular telephone must be powered-on to execute the programs and operate the circuits to monitor the battery and issue the alarm.

Cellular telephones have many uses, including for use in an emergency to call the police, an ambulance or a tow-truck. Indeed, some users have expressed a desire to stow a cellular telephone in their automobile or other vehicle solely for emergency situations. For example, parents of a driving teenager may stow an emergency cellular telephone in their automobile and tell their child that the telephone is only to be used in an emergency. Similarly, a mountain hiker may carry a light-weight cellular telephone to call for rescue in an emergency. In addition, emergency cellular telephones may be in the future marketed that have a single function of calling a predetermined emergency telephone number, e.g., home or "911", when powered.

If a cellular telephone is to be used as an emergency telephone, then it is critical that the battery be sufficiently charged when the telephone is powered and a call is made on the telephone.

Batteries suitable for emergency cellular telephones must be able to stay dormant for months without being replaced or recharged. These batteries must supply sufficient electrical current to power a telephone and allow for calls to be transmitted from the telephone, even after being dormant for months, if not years. Emergency batteries will lose their charge if the telephone is left on for extended periods of time. The batteries may also lose their charge if the telephone is dormant too long due to the self-discharge characteristics of batteries or if the telephone allows the charge to trickle from the batteries, or if there is a defect in the battery. In any of these events, the battery may not be sufficiently charged when an emergency arises and the cellular telephone is powered to make a call for help. The failure of an emergency cellular telephone to work could make an emergency situation worse and prevent someone needing assistance from calling the police, an ambulance or other assistance. Accordingly, there is a need to ensure that the batteries used to power emergency cellular telephones have stored sufficient electrical power to power the telephone after long periods of remaining dormant. In addition, there is a need to ensure that batteries in an emergency cellular telephone give a warning if and when they lose their charge.

It is known in the art to adapt cellular telephones for usage in roadside emergency call boxes. As described in U.S. Pat. Nos. 4,788,711 and 5,377,256, cellular telephones are permanently mounted in roadside telephone call boxes and are preprogrammed to call a central dispatcher for a police department or other governmental organization. Mounting a cellular telephone in a roadside call box does not necessarily pose problems with batteries as these permanently positioned telephones may be powered by a power-line from an electric utility. In addition, these call-box cellular telephones are always turned-on so that they can be monitored by the central dispatcher and regularly perform self-maintenance functions. For example, the cellular telephone is preprogrammed to regularly and automatically call the dispatcher and verify that it is properly functioning or to report difficulties that the telephone has detected regarding its operations. If a back-up battery in the cellular telephone becomes discharged, the active cellular telephone will detect the low-charge on the battery and report the low battery condition to the central dispatcher the next time that the telephone automatically places a status call. However, the apparatus and methods employed for cellular phone based roadside call boxes do not establish prior art for the present invention because the present invention performs battery tests and warning functions while the phone is off; the emergency call boxes either have no "off" state, or perform no function while in an "off" state.

SUMMARY OF THE INVENTION

Many cellular telephone users are buying telephones for safety applications, and, in particular, for use primarily in emergency situations. These telephones should have a low cost and long battery shelf life. A safety telephone (also referred to as an emergency telephone) will most likely contain alkaline batteries or another battery type which exhibits long shelf life. Although a safety telephone is seldom used, it is important that it successfully place a call when powered, because it is used in emergency situations. Many requirements must be met for a call to be placed successfully, one of which is adequate battery capacity. However, since a safety telephone is likely to be stored out of sight and seldom used, the user may forget to replace or recharge the batteries when needed. Existing cellular telephones contain low battery warnings, but they are inadequate for safety telephones because the warnings occur only after the user has turned on the telephone; no battery tests or warnings occur while the telephone is turned off.

The cellular telephone includes a low power timer which runs when the telephone is in an off state. The timer "wakes up" (powers-up) a processor in the telephone at a predetermined interval (for example, once per day or once per week). After each timer-controlled "wake-up", the processor performs a test to estimate remaining battery capacity. This can be done by measuring battery voltage with a load on the battery or other conventional battery charge monitoring techniques. If the battery capacity is adequate, the telephone processor turns off and the timer is re-staged. If the battery capacity is low, a warning is issued.

The warning may consist of an automatic cellular telephone call to a predetermined number (which is loaded into the telephone by the user or carrier via the keypad and/or a system connector) and other conventional warnings, such as beeps, display, etc., by the telephone. If a warning call is placed, the number called can be the user's land line number, another cellular number or a carrier number. Once the call is established, the "warning" can consist of a tone, combination of tones, voice message (which requires voice synthesis in the telephone) or data.

DETAILED DESCRIPTION OF THE DRAWINGS

Figure 1:
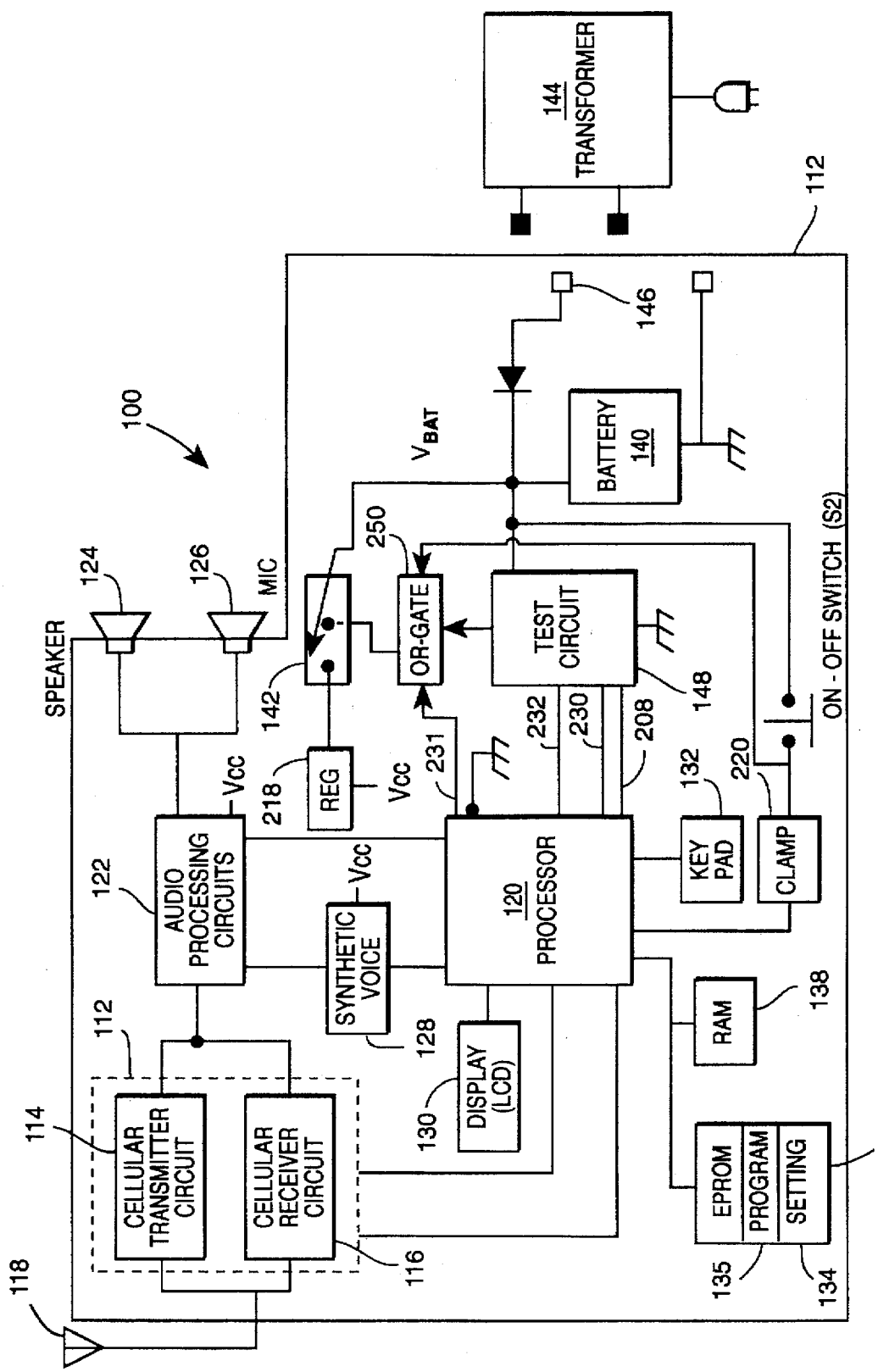
FIG. 1 is an exemplary block diagram for a cellular telephone.

FIG. 1 illustrates a block diagram of a hand-held mobile cellular telephone 100 associated with the present invention. Although they are particularly suited for use in small hand-held portable telephones, the principles of the present invention are applicable to any type of battery operated wireless communication instrument in which reduction of power consumption is desirable. The components of the cellular telephone are conventional except for the battery monitoring circuit that is active even when the telephone is off.

The cellular telephone 100 of the present invention includes transceiver 112 having a transmitter 114 and a receiver 116 which are coupled to a common antenna 118. The transmitter and receiver circuits 114, 116 are controlled by a microcontroller 120 that may be one of a variety of commonly available microcontrollers. Audio signals for transmission or audio signals that have been received pass through the audio processing circuit 122. Audio processing circuit 122 converts the received audio signals to signals suitable for the speaker 124 and converts the electrical signals from the microphone 126 to signals suitable for the transmitter circuit 114. In addition, the audio processing circuits 122 may receive synthetic voice signals such as "low battery warning", from a voice generator 128, that is controlled by the microcontroller 120.

The microcontroller 120 also controls the display 130 for the cellular telephone and receives input signals from the telephone keypad 132. For example, the keypad can be used to enter telephone number(s) to be stored at a memory location allocated for user setting information location 134 in a nonvolatile memory 136 associated with the microcontroller. Executable program instructions may also be stored in a location 135 of nonvolatile memory. The microcontroller may also access a volatile memory 138 as a temporary storage location.

Electrical current to operate the components of the cellular telephone is provided by a battery 140, e.g., an alkaline battery. The battery is connected to most components of the telephone via switch 142. A regulator 218 connected to the battery provides uniform voltage (Vcc) to the other electrical components in the telephone, except for the test circuits. When the switch is open (OFF), the battery is disconnected from the other components of the telephone, with the exception of the test circuit 148 which is always coupled to the battery. In addition to the battery, power can be provided to the telephone by a transformer 144 that connects to charging terminals 146 on the telephone. The transformer can also be used to recharge the battery if a rechargeable battery is being used.

Figure 2:
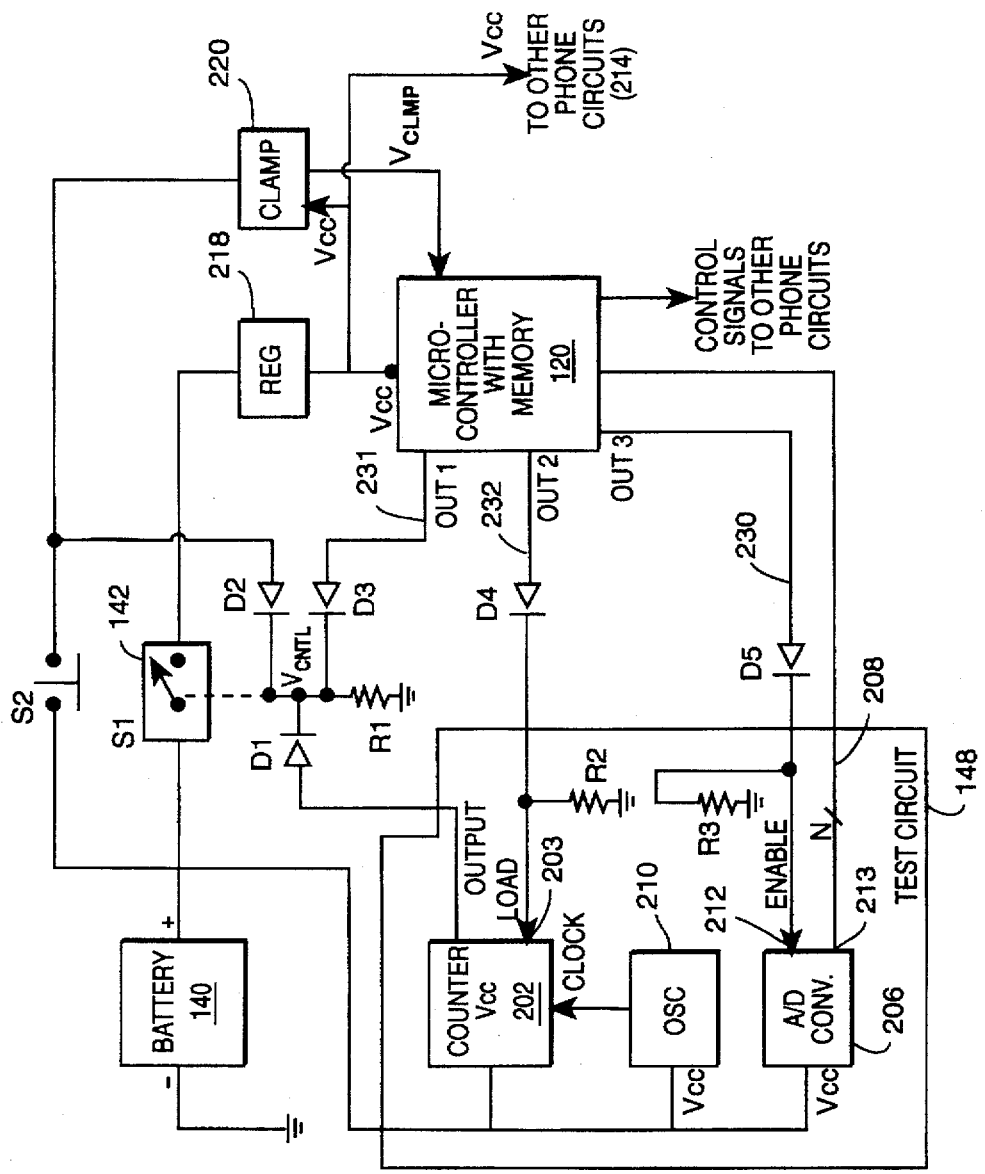
FIG. 2 is an exemplary block diagram of a battery monitoring circuit coupled to the microcontroller of a cellular telephone.

The battery test circuit is shown in FIG. 2, and described in subsequent paragraphs. For this circuit description, "set" or "high" refers to a logic level that is the higher of two valid digital output states, "reset" or "low" refers to a logic level that is the lower of two valid digital output states.

The battery test circuit 148 monitors the charge level of the battery 140 by applying a load to the battery and then measuring battery voltage. A load is placed on the battery by turning on circuits within the phone. The test circuit outputs a digital value corresponding to the battery voltage, which in turn is representative of the charge state of the battery. The voltage level output from the battery 140 is applied to an analog-to-digital (A/D) converter 206 that transforms the voltage level input from the battery to a digital value output on a bus 208 from the converter to the microcontroller 120. The microcontroller compares the digital value representative of battery charge level to a predetermined value stored in nonvolatile memory 136 [FIG. 1] to ascertain whether the charge level of the battery is sufficient to power the telephone and execute an emergency wireless communication. If the battery charge level is below the predetermined level, the microcontroller initiates an alarm sequence.

The test circuit 148 includes the timer counter 202, an oscillator 210, the analog-to-digital (A/D) converter 206, and resistors $R_2$ and $R_3$. External to but associated with the test circuit 148 are diodes D1–D5, other resistors (R1), switches (Sn), a regulator 218, a voltage clamp 220, the battery 140 and the microcontroller 120. The oscillator 210 provides a clock signal used by the counter 202 to time the dormant periods (power off) of the cellular telephone, and, in particular, the periods between microcontroller wake-up occurrences. The counter 202 has a clock input from the oscillator, a load input 203 from the microcontroller 120 and an output to the battery switch ($S_1$) 142. The counter 202 may consist of a series of staged flip-flops, with one stage per counter bit, or may be some other conventional counting circuit. Each clock pulse from the oscillator 210 causes the counter value to decrease by one. When the counter value equals zero, two actions occur within the counter: (1) the clock pulses from the oscillator are inhibited from clocking the counter, thereby stopping the counting process, and (2) the output of the counter is set to close switch $S_1$ 142. This causes battery power to be applied to the microcontroller and other telephone circuits. When the counter is running and has a non-zero count value, the counter output is low to switch $S_1$ 142. The load input 203 from microcontroller 120, when high, inhibits the counting process and loads the counter 202 with a predetermined, non-zero value (initialization value) that corresponds to a predetermined dormant period. The counter 202 operates (counts) when the load input 203 is low and the counter value is not equal to zero. After the load 203 input changes from high to low, the time required for the counter 202 to reach zero is based upon a predetermined value loaded into the counter 202 and the frequency of the oscillator 210. These values may be selected to produce a time-out period of one day to one week, or another period stored into memory.

The A/D converter 206 has (as does the oscillator 210 and counter 202) an analog voltage input directly from the battery 140 that is not disconnectable by switch $S_1$. The converter has an enable input 212 and a digital output 213 to bus line 208. The A/D conversion process produces a digital value that is proportional to or otherwise representative of the analog voltage level from the battery. The converter 206 is enabled during the wake-up process initiated when the counter 202 switches power to the microcontroller via switch $S_1$. When the converter 206 enable input 212 is high, a voltage conversion is performed and a digital value is sent to the microcontroller. The conversion occurs when the other telephone circuits are powered so that the battery voltage is measured with a load applied to the battery. When the converter 206 enable is low, no conversions are performed and no voltage level exists at the digital output 213.

Switch 1 ($S_1$) 142 when closed directs power to the microcontroller 120 and other phone circuits 214, except for the test circuit 148 that receives battery power independently of the switches. The switch $S_1$ is activated by a control voltage $V_{CNTL}$. When the control voltage $V_{CNTL}$ is low, the switch $S_1$ is open. When the control voltage is high, the switch $S_1$ is closed. Switch $S_2$ corresponds to a user power button and is normally open. It is depressed by the user to turn the phone on and off. Diodes ($D_1$, $D_2$ and $D_3$) and resistor $R_1$ are used as a "logical OR" gate 250 [FIG. 1] that activates switch $S_1$ when 1) button $S_2$ is depressed, 2) the counter 202 outputs a high enable signal, or 3) when the microcontroller sets the output to D3. Whenever the anode of diodes $D_1$, $D_2$ or $D_3$ are set high, the control voltage is applied to switch $S_1$ to close the switch.

Figure 3B:
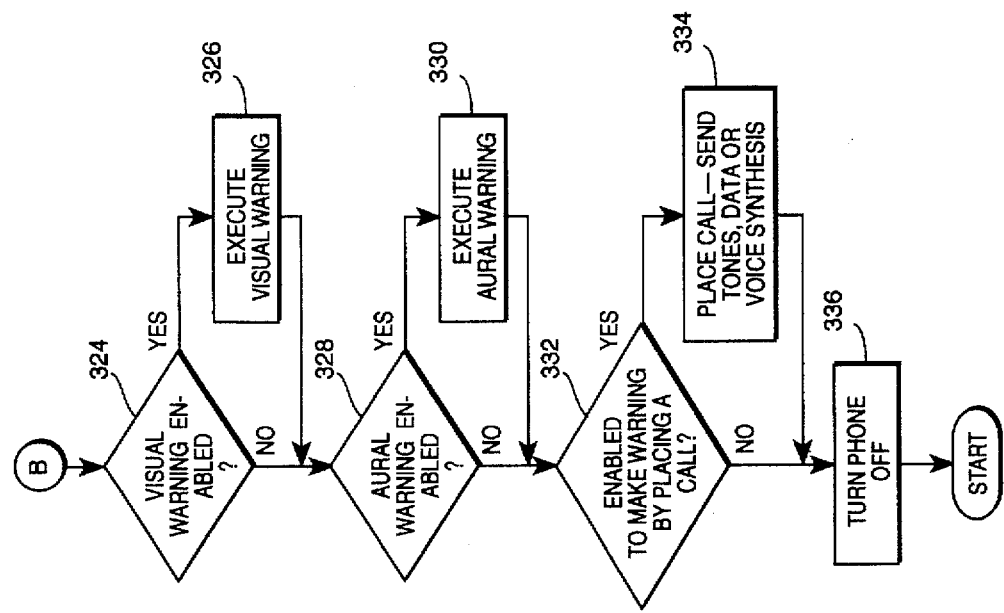
FIGS. 3A and 3B are flow charts of the software used by the microcontroller to monitor the battery charge level, issue low battery warnings and to control the receiver.
Figure 3A:
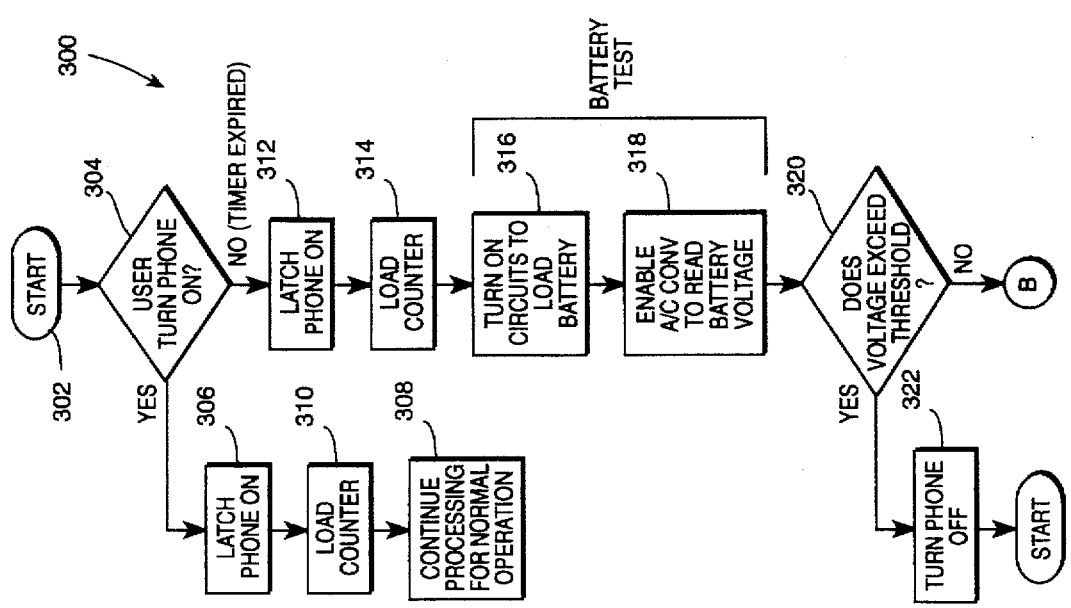

The simplified flow chart 300 of FIGS. 3A and 3B depict the logic of the program instructions, stored in memory 135, necessary to control the battery monitor functions. When the user presses switch $S_2$ (which may be a key on keypad 132), battery voltage is applied to the anode of diode $D_2$, causing the control voltage to $S_1$ to be high. This condition closes switch $S_1$, thereby applying battery voltage to the regulator 218. The regulator applies a regulated voltage to the microcontroller 120 and other telephone circuits 214. When the microcontroller begins its execution of the program, it tests the output $V_{CLMP}$ of the clamp 220 to determine if switch $S_2$ is closed (indicating power-up caused by user input step 304). If the clamp voltage is high, indicating that the user switch $S_2$ is closed, the microcontroller then sets the anode of diode D3 high. This provides a second source of current for R1 in order to maintain $V_{CNTL}$ high (to close switch $S_1$), and continue applying power to the telephone. This setting of diode $D_3$ in step 306 "latches" the phone in an ON state, allowing the user to release switch $S_2$ and still have the phone remain on. The microcontroller output to diode $D_3$ remains high until the user turns off the telephone or the telephone automatically turns off.

When the phone was turned on by the user (as sensed by microcontroller via the clamp output), program execution branches to a group of instructions which provides functionality required by the user for normal cellular telephone service. This functionality (represented by step 308) is conventional and is not pertinent to this invention.

In step 310, the microcontroller output to diode $D_4$ is set to inhibit the counter from counting and to load it with an initialization value. In addition, by setting the output to diode $D_5$, on line 230 the microcontroller is able to monitor battery voltage by enabling the A/D converter to output a digital value of the battery voltage on bus (line) 208. To turn the telephone off, the user presses switch $S_2$ again, which is sensed by the microcontroller by monitoring the output of the clamp. After sensing that switch $S_2$ is closed, the microcontroller resets the output to diode $D_3$, on line 231 to cause switch $S_1$ to open and disconnect power from the microcontroller and other telephone circuits 214.

After the microcontroller is no longer powered, the input to diode $D_4$ becomes low to enable the counter 202 to begin counting. Similarly, the microcontroller, without power, allows the input to diode $D_5$ to become low and disable the A/D converter 206. While the phone is in an off-state, the counter times the dormant period. When a count value of zero (0) is reached, the counting process stops and the counter output is set. With this output set, voltage is applied to cause switch $S_1$ to close. This applies battery voltage to the regulator which applies power to the microcontroller. When the micro-controller begins instruction execution, i.e., wakes up, it first tests the clamp 220 output to determine if switch $S_2$ is closed (indicating power-up caused by user input—see step 304). For this case, switch $S_2$ is not closed because power was applied by the test circuit and not the user. The microcontroller then sets the output to diode $D_3$, which provides a second source of current to maintain the closure of switch $S_1$. This action "latches" the phone in an ON state in step 312. The microcontroller output to diode $D_3$ remains high while the battery test is being performed to ensure that the microcontroller and other telephone circuits are powered during the battery test.

After the microcontroller has been turned on by the test circuit, the microcontroller sets the output to diode $D_4$ on line 232 to reinitialize the counter with a timer start value, in step 314. The load signal applied by the microcontroller also inhibits the counter while the microcontroller is powered.

The battery test is performed by the microcontroller by first turning on other telephone circuits (to place a load on the battery) in step 316. The battery voltage, while under a known load, is indicative of remaining battery capacity. The microcontroller loads the battery by controlling internal circuits to turn on, or apply power, to selected telephone circuits, such as logic, audio processing, memory, DSP, receiver or transmitter circuits. The means for controlling power to said circuits is widely used for executing "sleep" modes that conserve battery capacity during normal modes of operation and is well known in that art. Alternatively, the phone could contain a load (resistor) and a switch expressly for loading the battery for test purposes, where the switch is controlled by the microcontroller to perform a test.

The microcontroller enables the A/D converter 206 by setting diode D₅ in step 318. The microcontroller compares the digital representation of the battery voltage level received from the A/D converter to a stored threshold battery level, in step 320. If the battery value comparison indicates that battery capacity is adequate, the microcontroller resets the input to diode D₃ to open switch S₁ and turn off the telephone in step 322. If the microcontroller determines the battery charge level is inadequate, then battery warnings may take place. As shown in FIG. 3B, when the program 300 determines to issue low battery warnings, the program may initiate a series of visual, audible and wireless warnings. In step 324, the program determines if the telephone is set (settings are stored in memory location 134, for example) to issue a visible low battery warning and, if so set, a visible warning will appear on the display 130 in step 326. Similarly, in steps 328 and 332, the microcontroller determines whether the telephone is set to issue audible and wireless (telephone call) warnings. If enabled, the microcontroller will cause a warning to sound from the phone in step 330, and/or for the transmitter circuit 114 to send a warning, e.g., synthetic voice warning, to a predetermined telephone number in step 334.

At the end of the battery test (and, if appropriate, any warnings), the phone is turned off, in step 322 or 336, by resetting the output to diode D₃, which opens switch S₁. When switch S₁ becomes open, the microcontroller no longer receives power from the regulator. After the microcontroller is no longer powered, the input to diode D₄ becomes low, making the load input to the counter on line 232 low. This enables the counter 202 to operate, beginning with the initialization value loaded into the counter while the load input was high. Also, with the input to diode D₅ on line 230 low, the A/D converter is disabled, including the output signals of the A/D converter. This ensures that no output signals from the A/D converter are applied to the unpowered microcontroller.

A special case involves installing a battery in the cellular telephone from an initial state of having no battery. For this case, the test circuit is powered by the battery and the counter 202 in the test circuit 148 assumes a random value. Thus, the time interval between battery installation and first battery test will be random (corresponding to range of values from zero (battery test initiated immediately after battery is installed) to a time period that corresponds to the maximum counter value). Subsequent battery tests will be timed per the desired interval as described above. If desired, the test circuit could be configured to load the counter with a predetermined value at battery installation to ensure a known time interval between battery installation and first test. However, this is deemed to add cost with little benefit, and is not included in the preferred embodiment.

A second special case involves a user attempting to turn the phone on while a counter initiated battery test is underway. Because a user may depress switch S₂ during a counter initiated battery test, the clamp 220 output is continuously sampled during the test. If the microcontroller senses that switch S₂ has been depressed, the counter initiated battery test is terminated and the cellular telephone is turned fully on for the user, and normal user operation occurs, which may include aural and visual low-battery warnings.

The invention has been described in connection with its preferred embodiment. The invention is not limited to the disclosed embodiment. It covers the various modifications, equivalent arrangements, and substitute components and steps included within the spirit and scope of the appended claims.

What is claimed is:

1. A wireless communication device operable in a plurality of states including a powered-off state and a battery test state, comprising:
 a battery having a charge level for supplying electrical power to the device; a timer counter coupled to the battery and operable in the powered-off state for causing the device to enter the battery test state when a predetermined period of time has elapsed with the device in the powered-off state, and said counter controls a switch to apply power from the battery to a battery charge level monitoring circuit and to a processor during the battery test state;
 the battery charge level monitoring circuit switchably coupled to the battery for generating a battery charge level signal proportional to the battery charge level during the battery test state;
 the processor is switchably coupled to the battery charge level monitoring circuit for sensing the battery charge level signal during the battery test state, and generating an alarm signal if the battery charge level is below a predetermined level, and
 wherein generation of the alarm signal includes powering a communication circuit in the device to establish an automatic wireless communication to a preselected telephone number to transmit a low battery charge warning.

2. A wireless communication device as in claim 1 further comprising communications circuits powered during the battery test state.

3. A wireless communication device as in claim 1 wherein the battery charge level monitoring circuit is disabled during the powered-off state.

4. A wireless communication device as in claim 1 wherein the timer counter is disabled and reinitialized during the battery test state.

5. A wireless communication device as in claim 1 wherein the device is a cellular telephone having a transmitter circuit, antenna and a synthetic voice circuit controllable by the processor, and the alarm signal includes transmitting a cellular telephone communication via the transmitter circuit and antenna to a telephone number stored in a memory accessible to the processor, and during the communication causing the synthetic voice circuit to send a synthetic voice low battery warning.

6. A method of automatically generating a low battery warning in a wireless communication device operable in a plurality of states including a powered-off state and a battery test state, and having a battery for supplying electrical power, the method comprising:
 a. placing the device in the powered-off state during which state the power is applied exclusively to a timer counter;
 b. causing the device to enter the battery test state during which state power is applied to a processor and a battery charge level monitoring circuit, where the test state is entered after a predetermined period of time has elapsed with the device in the powered-off state and where the time is measured by the timer counter;
 c. during the battery test state, activating one or more circuits in the device to apply a load to the battery; sensing the charge level of the battery and generating a battery charge level signal proportional to the charge level of the battery with the monitoring circuit;
 d. sensing the battery charge level signal by the processor;
 e. generating an alarm signal with the processor if the battery charge has dropped below a predetermined level, and establishing a wireless communication to a preselected telephone number to transmit the alarm signal, and f. after step (d), and if the battery charge is above the predetermined level, switching power off to the one or more circuits, the processor, and to the monitoring circuit, and returning to step (a).

7. A method as in claim 6 wherein step (c) is further performed by applying an electrical load on the battery.

8. A method as in claim 6 wherein the low battery warning includes a verbal warning.

9. A portable cellular telephone comprising:

an antenna;

a cellular transmission circuit coupled to the antenna;

a cellular receiver circuit coupled to the antenna;

an audio processing circuit coupled to an input of the transmission circuit and to an output of file receiver circuit;

a battery supplying electrical power to the transmission and receiver circuits, a processor and to the audio processing circuit through a switch;

a battery charge level monitoring circuit coupled to the battery and controlling the switch to disconnect power during a power-off state to the transmission and receiver circuits, processor and the audio processing circuits, where said monitoring circuit switches, during the power-off state, power to the processor and the battery charge level monitor circuit, when a timer counter indicates a predetermined time has elapsed;

the processor is coupled to the battery charge level monitor circuit and, when activated by the monitoring circuit, sensing a remaining charge retained by the battery, and when the remaining charge in the battery drops below a predetermined level, the processor automatically powers the transmission circuit and the audio processing circuit, generates a predetermined dialing code to establish a wireless telephone communication with another telephone and sends a low battery audio signal through the audio processing circuit, transmitter and antenna to the another telephone.

10. A portable cellular telephone as in claim 9 wherein the audio signal includes a synthesized voice signal.

11. A portable cellular telephone as in claim 10 further comprising a voice synthesizer powered by the processor to generate the synthesized voice signal.

12. A portable cellular telephone as in claim 9 wherein after the low battery audio signal is transmitted, the telephone emits an audible low battery sound.

13. A method for automatically sending a low battery warning transmission from a cellular telephone having an antenna, transceiver, audio processor, speaker and microphone, battery, electrical display, input keys, controller processor, and nonvolatile memory, said method comprising:

a. powering the telephone by applying electrical power from the battery to the transceiver, audio processor, display, and controller processor, and switching the processor to an active mode;

b. initiating a cellular telephone voice communication from the powered telephone by dialing a telephone number with the input keys and sending the dialed number to start the communication;

c. deactivating the telephone by shutting off electrical power to the transceiver, audio processor, and display, and switching the processor to an inactive mode;

d. while the processor is in the inactive mode monitoring a charge level in the battery at certain predetermined times;

e. if the monitored charge level in the battery falls to or below a predetermined level, automatically powering the processor and applying battery power to the transceiver and audio processor, and automatically initiating a telephone call to a pre-selected telephone number;

f. upon the establishment of a telephone communication in step (e), sending a low battery warning signal via the telephone communication;

g. after sending the low battery warning in step (f), deactivating the telephone as in step (c).

* * * * *